3,297,473
SEALANT COMPOSITION AND PROCESS
George F. Bulbenko, Levittown, Pa., assignor to Thiokol Chemical Corporation, Bristol, Pa., a corporation of Delaware
No Drawing. Filed Jan. 2, 1964, Ser. No. 335,391
15 Claims. (Cl. 117—72)

The present invention relates to a novel liquid polysulfide polymer based sealant composition and to processes for bonding liquid polysulfide polymer based sealant compositions to structural element substrates.

Curable, liquid polysulfide polymer based sealant and caulking compositions have long been known in the art. They are based on curable liquid, mercaptan terminated polysulfide polymers. The structure and preparation of these polythiopolymercaptan polymers are disclosed in U.S. 2,466,963. These compositions are used in sealing and/or caulking operations to bond together, and/or fill seams between, various types of structural elements in various industries. The adhesive qualities of polysulfide polymers are such, however, as to usually require the use of an adhesive additive in the polysulfide polymer based sealant composition in order to insure a good bonding of the cured sealant to the substrate. The adhesive additives which have been available for this purpose to date, however, such as those of a phenolic nature, usually only provide for a polar, rather than a chemical, type bonding of the cured sealant to the substrate. This polar type of bonding is susceptible to attack by polar solvents such as water whereupon the bond tends to lose its strength and thus impair the utility of the sealant under conditions where it is subject to such attacks.

Those in the art have desired to provide polysulfide polymer based sealant and caulking compositions and/or processes wherewith such compositions could be strongly and chemically bonded to the substrate(s) being treated therewith and particularly where the coated substrate(s) are to be subject to repeated and/or prolonged contact with polar solvents such as water.

An object of the present invention, therefore, is to provide a novel liquid polysulfide polymer based caulking or sealant composition which will allow for the attainment of a strong and lasting bonding of the sealant to the substrate(s) to be treated therewith, particularly for those applications where the sealant is to be used in the presence of polar solvents.

Another object of the present invention is to provide one or more processes by means of which liquid polysulfide polymer based sealant and caulking compositions may be used so as to attain a strong and lasting bonding of the cured composition to the substrate(s) being treated therewith, particularly where the sealant is to be used in the presence of polar solvents.

It has now been unexpectedly found according to the present invention that a strong and lasting bonding of cured, liquid polysulfide polymer based sealant and caulking compositions to the substrate(s) being treated therewith can be attained, particularly in the presence of polar solvents, if the sealant composition is used in conjunction with one or more adhesive additive compounds having the structure

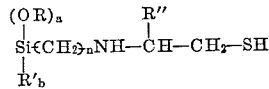

in which R is a lower alkyl group such as methyl, ethyl, propyl, isopropyl and butyl; R' may be H or a lower alkyl group such as methyl, ethyl, propyl, isopropyl and butyl; $a$ is a whole number of 1 to 3, $b$ is a whole number of 0 to 2 and $a+b=3$; $n$ is a whole number of 1 to about 6 and R" is H or a lower alkyl group such as methyl and ethyl. In a given case where more than one R or R' group is used in a given compound, the R or R' groups used may be the same or different alkyl groups where the R' groups used are not H.

The preparation and properties of the adhesive additives used in the novel compositions and processes of the present invention are disclosed in a U.S. patent application filed on an even date herewith in the name of George F. Bulbenko and entitled "β-Mercapto Alkyl Amino Alkyl Trialkoxy Silanes", Serial number 335,426, filed January 2, 1964.

The adhesive additive compound may be used according to the present invention in the form of a prime coat wherewith the substrate to be treated is first primed and the liquid polysulfide polymer based sealant compositions are then added to, and cured on, the thus treated substrate. The silicon containing adhesive additive may also be used, according to the present invention, by being admixed into the curable, liquid polysulfide polymer based sealant or caulking composition and then applying, and curing thereon, the curable composition to the substrate(s) being treated. Whether used as a priming agent and/or admixed in the sealant composition, the silane containing adhesive additive should be used in such a quantity as to provide about 1 to 3.5 parts by weight of the additive per 100 parts by weight of the curable, liquid polymer being used.

The adhesive additive used according to the present invention, as noted above, may be termed a β-mercapto alkyl amino alkyl trialkoxy silane. An example of such compounds is β-mercapto ethylamino propyl triethoxy silane which has the structure

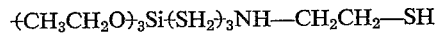

The polysulfide polymers upon which the sealant or caulking compositions of the present invention are based are those liquid polythiopolymercaptan polymers as are disclosed and claimed, as noted above, in U.S. Patent 2,466,963. The most preferred of such polymers according to the present invention, are those having a molecular weight of about 500 to 4000. Polymers having such molecular weights are preferred in that they allow for the most efficient cure times.

The liquid polysulfide polymer curing agents which may be used in the sealant compositions of the present invention include all those materials known to the art as liquid polysulfide polymer curing agents such as polyepoxy resins, lead peroxide, calcium peroxide, barium peroxide, tellurium dioxide and the various chromate salts such as are disclosed in U.S. Patent 2,964,503. About 2.5 to 10 parts by weight of one or more of such curing agents should be used according to the present invention, per 100 parts by weight of liquid polysulfide polymer being used.

With the novel sealant compositions and processes of the present invention, a strong bonding of the cured sealant composition to the substrate can be obtained in about 2 to 24 hours at room temperature (about 25° C.).

It is to be understood, according to the present invention, that the concept of "treating" one or more substrates by means of the novel processes and/or compositions disclosed herein includes providing such substrates with protective coatings of the cured compositions of the present invention and/or filling voids between and/or bonding together two or more substrates, which substrates may or may not be composed of the same material. The substrates to be thus treated, according to the present invention, include those of a wood nature, those of a silicaceous nature such as glass and those of a metallic nature such as aluminum, iron and steel as well as zinc and/or chrome coated iron or steel.

The curable compositions of the present invention may also contain various types of inert materials commonly employed in liquid polysulfide polymer based sealant and caulking compositions such as fillers, plasticizers, pigments, ultraviolet light stabilizers, cure accelerators, and the like.

Where the silane adhesive additive compounds of the present invention are to be used as priming agents they may be applied to the surface of the substrate(s) being treated in the form of a solution so as to provide thereon at least a monomolecular layer of the silane material. The solvent medium employed in such a case should be a fairly volatile material such as ethyl alcohol, toluene, Cellosolve, methanol, n-butanol, isobutanol, chloroform, ethyl acetate, acetone and benzene.

The curable compositions of the present invention have a pot life (working life) of about 0.5 to 24 hours and the pot life of these compositions must be taken into consideration when admixing and/or bringing the curing agent in contact with the adhesive additive and/or liquid polysulfide polymer.

The following example is merely illustrative of the present invention and is not intended as a limitation upon the scope thereof.

*Example.—Preparation of β-mercapto ethyl amino propyl triethoxy silane*

Into a stainless steel bomb there was charged 44 grams (0.20 mol) of gamma-amino propyl triethoxy silane, i.e., $(CH_3CH_2O)_3Si$—$(CH_2)_3$—$NH_2$, 9 grams of ethylene sulfide (0.15 mol) and 100 milliliters of sodium dried benzene. No exotherm was observed at this time. The system was purged with nitrogen and the bomb was capped and placed in a 100° C. oven for about 20 hours. The bomb was then removed from the oven and chilled to room temperature and opened. No polymer formation was observed. The reaction system was distilled at atmospheric pressure at a pot temperature of 70° C. No unreacted monomer was removed but some polymeric ethylene sulfide did form in the distillation flask under slight vacuum. Eighty-one grams of benzene were recovered. At a higher vacuum of more than 1 millimeter of mercury, a small amount of high boilers was collected in a $CO_2$/acetone trap. This material gave a weak test for SH and the amount of material recovered was 2 grams. The residue in the distillation flask was a milky tan colored liquid weighing about 41 grams. This residue was taken up in dry benzene and filtered. The filtrate was freeze dried and after the freeze drying some solids formed and the filtrate was filtered again. A net weight of 38 grams of filtrate was obtained. About 25 grams of the filtrate was subject to fractional distillation. Cut #1 was taken at 50–52° C. at 0.2 millimeter of mercury. 8 grams were obtained, which, upon analysis showed a trace amount, i.e., 0.11% of SH and a nitrogen content of 6.3. Cut #2, the β-mercapto ethyl amino propyl triethoxy silane, was taken at 97–98° C. at 0.2 mm. Hg. It was a water white liquid. Ten and a half grams were obtained, which, upon analysis showed an SH content of 11.4% and a nitrogen content of 4.8%. The refractive index of the product at 26° C. was 1.4500 and its density at 26° C. was 0.96. The calculated percent SH and percent N for β-mercapto ethyl amino propyl triethoxy silane are 11.75 and 4.98%, respectively. The residue remaining in the distillation flask weighed 5 grams.

β-Mercapto ethyl amino propyl triethoxy silane produced as above was used in this example as a primer with which to prime various substrates before attempting to bond a polysulfide polymer based sealant composition thereto. The substrates used were aluminum, stainless steel and glass. The silane compound was used in the form of an ethanol solution by dissolving 12 parts by weight of the silane compound in 88 parts by weight of ethanol. The priming solution was then applied to the surface of the substrate by lightly wiping the surface once with a cotton swab saturated therewith. The primed substrate was allowed to stand overnight at room temperature during which time the solvent evaporated. A bead of the curable polysulfide polymer based sealant composition was then applied to the primed substrate and cured thereon for one week at room temperature. At the end of this time one set of coated panels was tested for adhesion of the bead to the panels and a second set of panels was immersed in tap water for one week at room temperatures before evaluating the adhesion of the sealant beads to this latter set of panels. The sealant formulation used was:

| | Parts by weight |
|---|---|
| LP-32 polysulfide polymer | 100 |
| Witcarb RD (calcium carbonate) | 30 |
| Titanox RA50 (titanium dioxide) | 10 |
| HiSil 233 (hydrated silica) | 3 |
| Calcium stearate (thioxotropic agent) | 1 |
| Stearic acid | 1 |
| Sulfur | 0.1 |
| | 145.1 |

LP-32 polysulfide polymer has essentially the structure

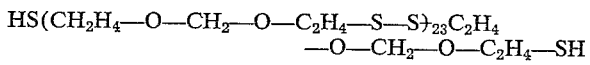

with about 0.5% cross-linking or branching by trichloropropane.

Prior to its application to the substrates the above sealant formulation was mixed with 10.3 parts by weight, per 100 parts by weight of this formulation, of a lead peroxide and Aroclor 1254 curing paste admixture containing about 50% $PbO_2$. Aroclor 1254 is a chlorinated biphenyl plasticizer containing about 54% chlorine. The adhesion test consisted of attempting to peel the cured sealant beads from the substrates. If the bead peeled off, it was noted as an adhesive failure. If the bead could not be removed without tearing the bead, this was noted as a cohesive failure. Borderline instances were noted as slight cohesive failures. The tests indicated only cohesive failures occurred.

In further tests, the same sealant and curing paste compositions given above were used with β-mercapto ethyl amino propyl triethoxy silane included as an adhesion additive according to the recipe:

| | Parts by Weight | |
|---|---|---|
| | A | B |
| Polysulfide Sealant Formulation | 140 | 140 |
| Lead Curing Paste | 15 | 15 |
| β-Mercapto ethylamino propyl triethoxy silane | 1 | 3 | to form the curable sealants A and B. They were applied as beads in duplicate to clean unprimed aluminum, stainless steel and glass panels and left to cure in air for one week at room temperature. One set of duplicates was tested for adhesion, whereupon all beads showed cohesive failure. The other set of panels was then immersed in tap water for a week at room temperature before testing and thereupon showed only cohesive failures. As little as 0.5 and as much as 5 p.b.w. of the silane would also impart good adhesion.

I claim:

1. A curable, liquid polysulfide polymer based sealant composition containing as an adhesive additive, about 0.5 to 5 parts by weight of at least one mercaptoalkyl amino polyalkoxy silane per 100 parts by weight of said polysulfide polymer.

2. A curable sealant composition comprising, in weight ratio,
(a) 100 parts by weight of liquid polysulfide polymer,
(b) about 2.5 to 10 parts by weight of liquid polysulfide polymer curing agent, and
(c) about 0.5 to 5 parts by weight of at least one compound having the structure

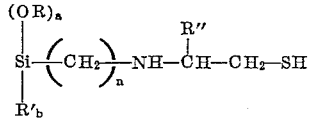

in which R is a lower alkyl group, R' and R" are selected from the group consisting of H and lower alkyl groups; $a$ is a whole number of 1 to 3, $b$ is a whole number of 0 to 2 and $a+b=3$ and $n$ is a whole number of 1 to about 6.

3. A composition as in claim 2 in which R is ethyl.
4. A composition as in claim 3 in which said compound has the structure

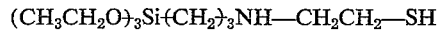

5. A process for bonding a curable, liquid polysulfide polymer based sealant composition in cured form, to a substrate which comprises treating said substrate, prior to the application of said composition thereto, with a primer which is essentially a compound having the structure

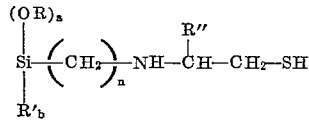

in which R is a lower alkyl group; R' and R" are selected from the group consisting of H and lower alkyl groups; $a$ is a whole number of 1 to 3, $b$ is a whole number of 0 to 2 and $a+b=3$ and $n$ is a whole number of 1 to about 6; applying said composition to the primed substrate and adhesively curing said composition on said substrate.

6. A process as in claim 5 in which said substrate is glass.
7. A process as in claim 5 in which said substrate is steel.
8. A process as in claim 5 in which said substrate is aluminum.
9. A process as in claim 5 in which said compound has the structure

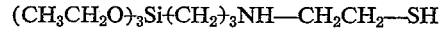

10. A process as in claim 9 in which said curable composition comprises 100 parts by weight of liquid polysulfide polymer and about 2.5 to 10 parts by weight of liquid polysulfide curing agent.
11. A process as in claim 9 in which said curing agent is lead dioxide.
12. An article which is a substrate having on at least one surface thereof a layer of mercapto alkyl polyalkoxy silane molecules, said layer being at least monomolecular in depth, and bonded thereto, a cured polysulfide polymer based sealant composition.
13. An article as in claim 12 in which said substrate is glass.
14. An article as in claim 12 in which said substrate is steel.
15. An article as in claim 12 in which said substrate is aluminum.

References Cited by the Examiner

UNITED STATES PATENTS 2,960,492  11/1960  Morton et al. _____ 260—46.5
3,123,495  3/1964   Carpenter et al. _____ 117—72

WILLIAM D. MARTIN, *Primary Examiner.*

H. W. MYLIUS, *Assistant Examiner.*

UNITED STATES PATENT OFFICE
CERTIFICATE OF CORRECTION

Patent No. 3,297,473                                    January 10, 1967

George F. Bulbenko

It is hereby certified that error appears in the above numbered patent requiring correction and that the said Letters Patent should read as corrected below.

Column 2, line 34, the structure should appear as shown below instead of as in the patent:

column 3, the structure should appear as shown below instead of as in the patent:

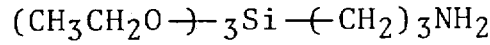

column 4, lines 26 and 27, the structure should appear as shown below instead of as in the patent:

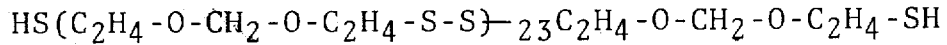

Signed and sealed this 9th day of January 1968.

(SEAL)
Attest:

EDWARD M. FLETCHER, JR.                            EDWARD J. BRENNER
Attesting Officer                                   Commissioner of Patents